(12) United States Patent
Hofmann et al.

(10) Patent No.: US 10,557,559 B2
(45) Date of Patent: Feb. 11, 2020

(54) ELECTROMAGNETIC ACTUATOR, FLUX WASHER BODY FOR AN ELECTROMAGNETIC ACTUATOR, AND METHOD FOR MANUFACTURING AN ELECTROMAGNETIC ACTUATOR

(71) Applicant: Robert Bosch GmbH, Stuttgart (DE)

(72) Inventors: Manfred Hofmann, Mimberg (DE); Girish Pandurangi, Bangalore (IN); Guy Edward Michalski, Eisenach (DE); Jose Jasson Flores Arellano, Toluca (MX)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/824,717

(22) Filed: Nov. 28, 2017

(65) Prior Publication Data
US 2018/0156348 A1    Jun. 7, 2018

(30) Foreign Application Priority Data
Dec. 6, 2016   (DE) .......................... 10 2016 224 288

(51) Int. Cl.
| | |
|---|---|
| *F16K 31/06* | (2006.01) |
| *H01F 7/08* | (2006.01) |
| *H01F 7/127* | (2006.01) |
| *H01F 7/16* | (2006.01) |
| *H01F 7/06* | (2006.01) |

(52) U.S. Cl.
CPC ............ *F16K 31/06* (2013.01); *H01F 7/081* (2013.01); *H01F 7/127* (2013.01); *H01F 7/1607* (2013.01); *H01F 2007/062* (2013.01)

(58) Field of Classification Search
CPC ......... Y10T 137/5987; Y10T 403/4966; F16K 31/06; F16K 31/0675; H01F 7/1607; H01F 7/081; H01F 7/127; H01F 2007/062; F16B 17/006; F16B 17/00
See application file for complete search history.

(56) References Cited

U.S. PATENT DOCUMENTS 5,127,434 A * 7/1992 Kline .................. B60H 1/00642
                                                                       137/596.17
5,682,678 A * 11/1997 Gallagher .................. F16B 5/01
                                                                       29/402.15

(Continued)

FOREIGN PATENT DOCUMENTS

DE        102012223430 A1    6/2014

*Primary Examiner* — Matthew W Jellett
(74) *Attorney, Agent, or Firm* — Norton Rose Fulbright US LLP; Gerard Messina

(57) ABSTRACT

An electromagnetic actuator, including an armature movable along a longitudinal axis in an armature chamber, a solenoid coil extending around the longitudinal axis for generating a magnetic field for moving the armature, an actuating element coupled to the movements of the armature, and a flux washer body which is situated at an axial end of the solenoid coil and has a recess extending in the direction of the longitudinal axis in which the actuating element is displaceably mounted. It is provided that the flux washer body has a two-piece design and includes a base body made of sintered soft magnetic material, which faces the solenoid coil and in which the recess for the actuating element is situated, and a metal washer pressed onto an end of the base body facing away from the solenoid coil.

12 Claims, 4 Drawing Sheets

(56) References Cited

U.S. PATENT DOCUMENTS

| | | | | |
|---|---|---|---|---|
| 6,201,461 | B1* | 3/2001 | Eichendorf | F02M 51/061 335/256 |
| 6,313,726 | B1* | 11/2001 | Golovatai-Schmidt | H01F 7/17 251/129.09 |
| 6,336,470 | B1* | 1/2002 | Zapf | F15B 13/0405 137/625.65 |
| 7,325,564 | B2* | 2/2008 | Ryuen | F16K 11/0716 137/375 |
| 2004/0041114 | A1* | 3/2004 | Hirata | F16K 31/0613 251/129.15 |
| 2007/0017587 | A1* | 1/2007 | Groschel | F16K 31/06 137/625.65 |

\* cited by examiner

ELECTROMAGNETIC ACTUATOR, FLUX WASHER BODY FOR AN ELECTROMAGNETIC ACTUATOR, AND METHOD FOR MANUFACTURING AN ELECTROMAGNETIC ACTUATOR

CROSS REFERENCE

The present application claims the benefit under 35 U.S.C. § 119 of German Patent Application No. DE 102016224288.1 filed on Dec. 6, 2016, which is expressly incorporated herein by reference in its entirety.

BACKGROUND INFORMATION

An electromagnetic actuator is described in German Patent Application No. DE 10 2012 223 430 A1, which includes an armature movable along a longitudinal axis in an armature chamber, a solenoid coil extending around the longitudinal axis for generating a magnetic field for moving the armature, an actuating element coupled to the movements of the armature, and a flux washer body which is situated at an axial end of the solenoid coil and has a recess extending in the direction of the longitudinal axis in which the actuating element is displaceably mounted. The magnetic flux washer body may, on the one hand, be used to enable a closed magnetic flux, and, on the other hand, it may represent a mechanical interface to an actuator system which is acted upon by the actuating element and may be designed, for example, as a sliding piston guided in a valve body of a hydraulic valve.

SUMMARY

The present invention relates to an electromagnetic actuator including an armature movable along a longitudinal axis in an armature chamber, a solenoid coil extending around the longitudinal axis for generating a magnetic field for moving the armature, an actuating element coupled to the movements of the armature, and a flux washer body which is situated at an axial end of the solenoid coil and has a recess extending in the direction of the longitudinal axis in which the actuating element is displaceably mounted. According to the present invention, it is provided that the flux washer body has a two-piece design and includes a base body made of sintered soft magnetic material, which faces the solenoid coil and in which the recess for the actuating element is situated, and a metal washer pressed onto the end of the base body facing away from the solenoid coil.

In accordance with the present invention, it may be desirable to provide the flux washer body with a kind of flange geometry in order for it to be used as a mechanical interface or fastener to an actuator system acted upon by the actuating element. When the flux washer body is manufactured from a sintered soft magnetic material, the formation of undercuts and grooves in the flux washer body is a very complex task since the sintered part must be subjected to additional complex processing after the sintering process. As a result of the flux washer body having a two-piece design, it is advantageously achieved that the inexpensively manufacturable base body made of sintered soft magnetic material does not have to be subjected to any complex machining after its manufacture. The required geometry is achieved by pressing on a metal washer. In this way, for example, at least one circumferential groove may be formed between the metal washer and the base body, without this groove having to be introduced into the base body.

Advantageous specific embodiments and refinements of the present invention are described herein.

Due to the two-piece design of the flux washer body, undercuts may be achieved in a simple manner. It is possible, for example, that at least one circumferential groove is formed between the metal washer and the base body of the flux washer body.

As a result of the base body having a shoulder on its side facing away from the solenoid coil, on which an extension projects in the direction of the longitudinal axis, the metal washer being pressed onto the extension, the metal washer may advantageously be pressed onto the base body in a defined manner, and the dimensions and geometries to be set in the process may be reliably achieved from a manufacturing perspective.

Advantageously, clamping jaws may be provided on the shoulder, which are permanently deformed when the metal washer is pressed on, so that a particularly stable press fit is achieved.

Advantageously, at least one stop rising from the end face may be provided on an end face of the extension facing away from the solenoid coil, the stop representing a stop for a pressing tool.

It is particularly advantageous when a plastic deformation area is present on an end face of the extension facing away from the solenoid coil, in which the material of the base body is deformed in such a way that the deformed material engages behind the metal washer on the side facing away from the solenoid coil. In this way, a particularly secure and rigid joint between the metal washer and the base body is achieved.

The metal washer may have a centric inside recess for accommodating the extension, so that the metal washer, during manufacture, may be easily pressed onto the extension. It is particularly advantageous when the metal washer, on an edge between the inside recess and an annular surface facing away from the solenoid coil, has a chamfer for accommodating the material of the base body engaging behind the metal washer. In this way, it is achieved that the deformed material does not project on the end face and does not form any interfering overhangs.

Moreover, advantageous is a flux washer body for an electromagnetic actuator of the described type, in which the flux washer body has a two-piece design and includes a base body made of sintered soft magnetic material, which faces the solenoid coil and in which a recess for an actuating element of the electromagnetic actuator is situated, and a metal washer pressed onto an end of the base body facing away from the solenoid coil. The flux washer body may be produced separately from the electromagnetic actuator and installed later on the electromagnetic actuator.

Moreover, advantageous is a method for manufacturing an electromagnetic actuator in accordance with the present invention, in which a flux washer body is manufactured in that a base body made of sintered soft magnetic material having a continuous recess is provided, and a metal washer is pressed onto one end of the base body, and the flux washer body thus created is assembled with a solenoid coil, an actuating element and an armature to form an electromagnetic actuator.

In a first pressing process, the metal washer may be particularly advantageously pressed onto an extension of the retained base body made of sintered soft magnetic material with the aid of a first pressing tool resting against a metal washer, until the first pressing tool makes contact with a stop rising from an end face of the extension. The stop advantageously defines a defined dimension by which the metal washer is to be pressed in the longitudinal direction onto the extension. In this way, it is reliably achieved that the flux washer body may be manufactured with a defined geometry. Recesses in the first pressing tool may advantageously avoid that a deformation area which is not deformed until the second pressing process is already deformed in the first pressing process.

Advantageously, a plastic deformation area of the base body is deformed on the end face of the extension facing away from the solenoid coil in a second pressing process, carried out after the first pressing process, in such a way that the deformed material engages behind the metal washer on the side facing away from the solenoid coil, whereby a particularly strong retention of the metal washer on the base body is achieved.

BRIEF DESCRIPTION OF THE DRAWINGS

FIG. 2 shows a perspective view of one exemplary embodiment of the base body of a flux washer body prior to a metal washer being pressed on.

DETAILED DESCRIPTION OF EXAMPLE EMBODIMENTS

Figure 1:
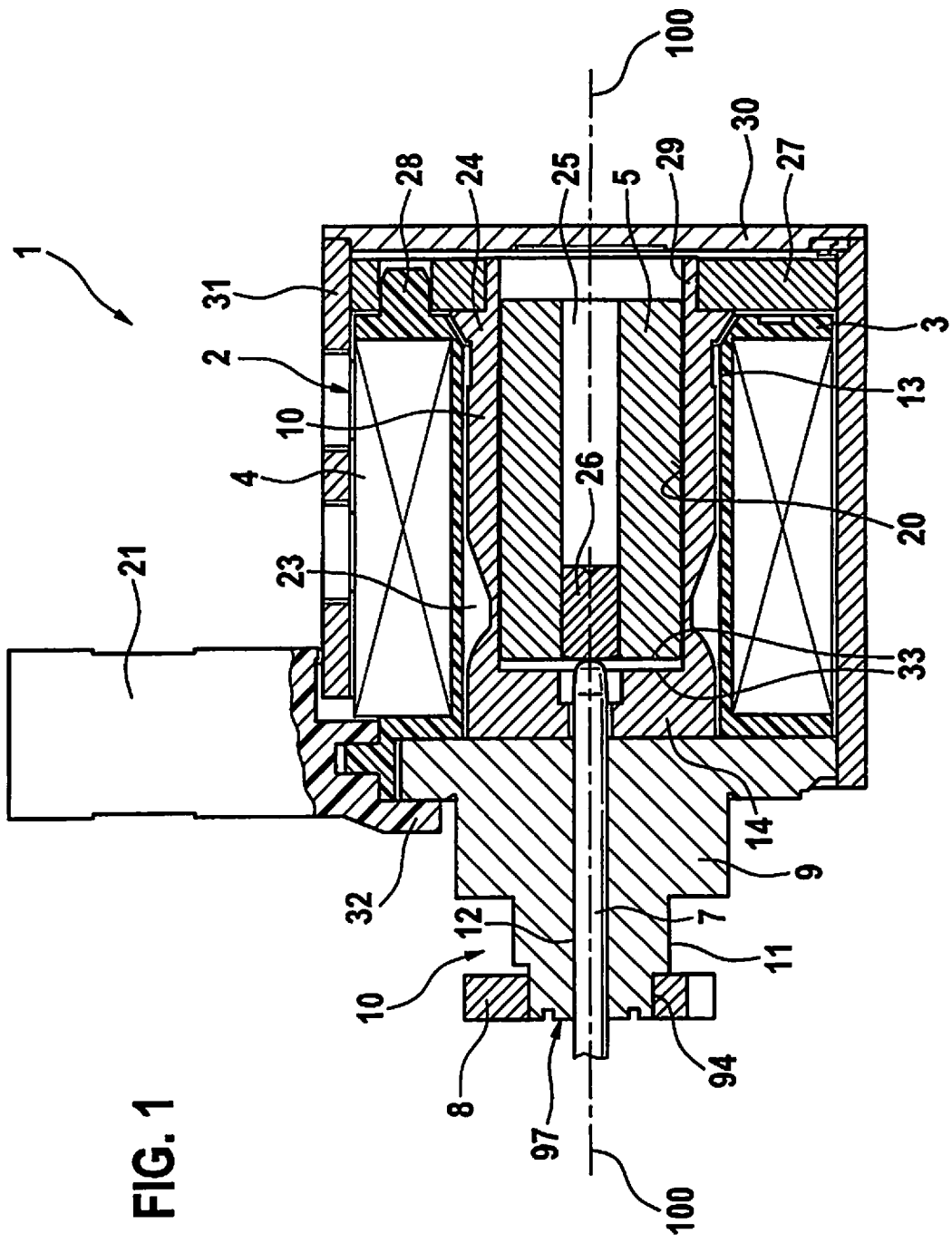
FIG. 1 shows a cross section through one exemplary embodiment of an electromagnetic actuator according to the present invention.

FIG. 1 shows a cross section through one exemplary embodiment of an electromagnetic actuator 1, which may be used, for example, to activate a sliding valve for a hydraulic transmission clutch. However, the electromagnetic actuator may also be used to actuate another actuator, for example for actuating a control valve having a seat valve design.

As is apparent from FIG. 1, electromagnetic actuator 1 includes a solenoid 2, which is designed as a proportional magnet, for example, and composed of a solenoid coil 4 and an armature 5 and preferably includes a magnetic pole tube 10. Solenoid coil 4 includes a coil body 3 which carries the coil winding and is designed, for example, rotation-symmetrically to a longitudinal direction 100. The electromagnetic actuator, for example, includes an electrical connection 21 for solenoid coil 4 which projects from longitudinal axis 100 in the radial direction. For example, a cylindrical central recess 13, which completely penetrates the coil body, is situated in coil body 3. The aforementioned pole tube 10 may be situated in central recess 13 and include a cylinder jacket, which on its outer circumference is provided with a recess 23. The magnetic flux through pole tube 10 is influenced by recess 23. Recess 23 is designed as a V-shaped groove, for example, and prevents a magnetic short circuit. The magnetic iron cross section reduced due to recess 23 already goes into saturation at low coil currents and thus acts similarly to an air gap between a magnetic core and a pole piece. The cylinder jacket of pole tube 10 may furthermore have an inside recess 20, which penetrates pole tube 10 up to a magnetic yoke 14. A cylindrical armature 5 may be mounted in a slidably displaceable manner in inside recess 20 of pole tube 10. The exemplary embodiment including the pole tube should be regarded as an exemplary specific embodiment of the solenoid. It is also possible, of course, to use other solenoids without a pole tube.

Magnetic yoke 14 has a through-opening for an actuating element 7, which is coupled to the movements of armature 5. Armature 5 may have a central inside borehole 25 into which an armature pin 26 is pressed. Armature 5 moves back and forth in inside recess 20 of pole tube 10 as a function of the electromagnetic force of solenoid coil 4 and the counter forces acting on armature 5 via actuating element 7 and, if necessary, a spring, which is not shown.

A pole disk 27 is put onto pole tube 10 at the right end-face end of coil body 3 in FIG. 1. Pole disk 27 rests on the pole tube in a conically protruding end area 24 of the same. Coil body 3, in turn, engages with a protrusion 28 into pole disk 27. Pole disk 27 has a central circular recess, through which a collar 29 of pole tube 10 surrounding inside recess 20 extends. Coil body 3 may be surrounded by a housing jacket 31, which is closed by a cover 30 covering pole disk 27.

A magnetic flux washer body 10, which closes the magnetic circuit and extends over central recess 13, is situated at the left axial end of coil body 3 in FIG. 1. A protrusion 32 of the plastic sheathing of electric connection 21 may, for example, surround flux washer body 10 and fix it to coil body 3.

A continuous recess 12, which forms a sliding bearing for actuating element 7, is present in flux washer body 10.

As is shown in FIG. 1, flux washer body 10 has a two-piece design and includes a base body 9 made of sintered soft magnetic material, which faces solenoid coil 4 and in which recess 12 for actuating element 7 is situated, and a metal washer 8 pressed onto the end of base body 9 facing away from solenoid coil 4. For example, at least one circumferential groove 11 is present between metal washer 8 and base body 9, so that flux washer body 10 has a flange-like geometry.

Figure 2:
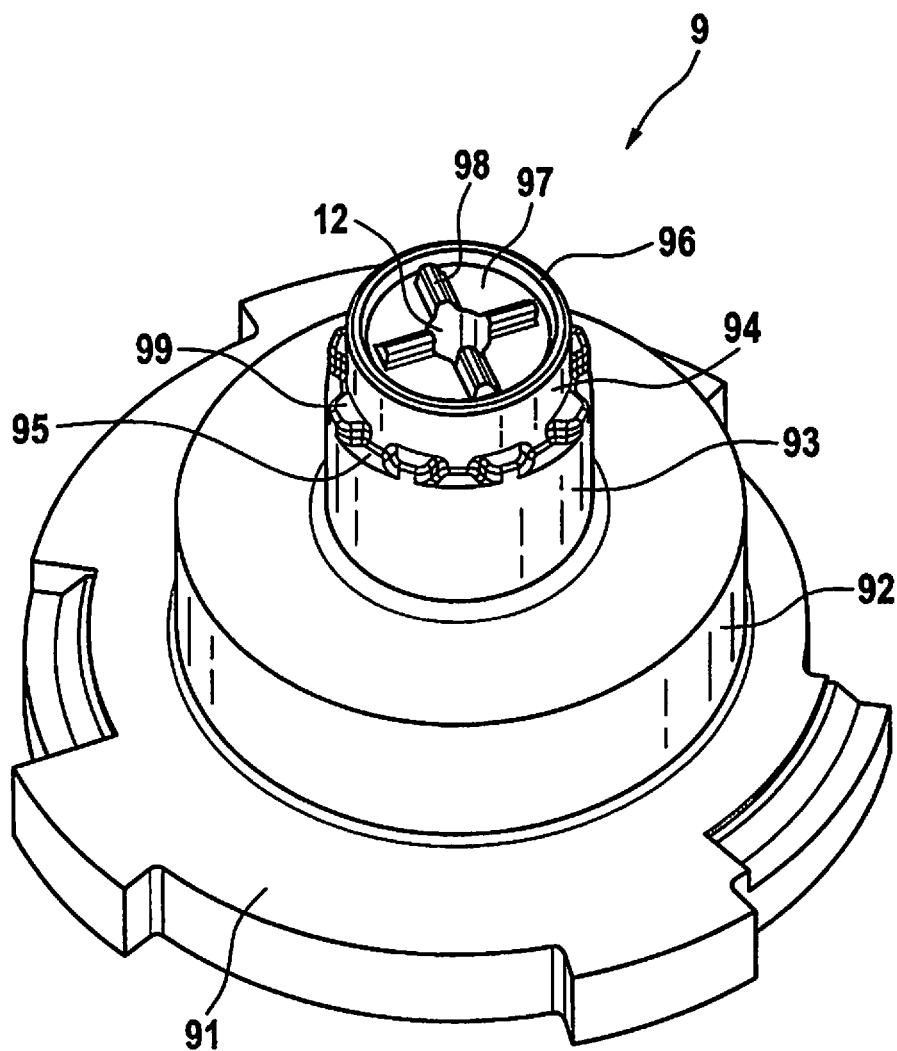

FIG. 2 shows an enlarged view of base body 9. Base body 9 is made up completely of sintered soft magnetic material, such as S-FeP-130, and is designed largely symmetrically to longitudinal axis 100. Base body 9 has a shape without undercuts which tapers proceeding from a base disk 91 in the direction of longitudinal axis 100. Base disk 91 is centrically aligned with longitudinal axis 100 and includes multiple radially protruding segments and recesses, which may also be irregularly distributed over the circumference. A first cylindrical disk-shaped dome 92 projects from base disk 91 in the direction of longitudinal axis 100. A second cylindrical disk-shaped dome 93 having a smaller outside diameter, whose circumferential surface forms the base of groove 11, adjoins first cylindrical disk-shaped dome 92.

As is apparent from FIG. 2, an extension 94 projects from second cylindrical disk-shaped dome 93 in the direction of longitudinal axis 100. Extension 94 has a smaller outside diameter than second cylindrical disk-shaped dome 93, so that the side of second dome 93 facing away from solenoid coil 4 forms a shoulder 95. Multiple clamping jaws 99 are provided on shoulder 95 distributed over the circumference. On an end face 97 of extension 94 facing away from solenoid coil 4, at least one stop 98 rising from end face 97 is provided. Four stops 98 are apparent in FIG. 2. Furthermore, a plastic deformation area 96, which is designed, for example, as a circumferential collar projecting from end face 97 in the direction of the longitudinal axis, is provided on end face 97 of extension 94 facing away from solenoid coil 4.

Figure 3:
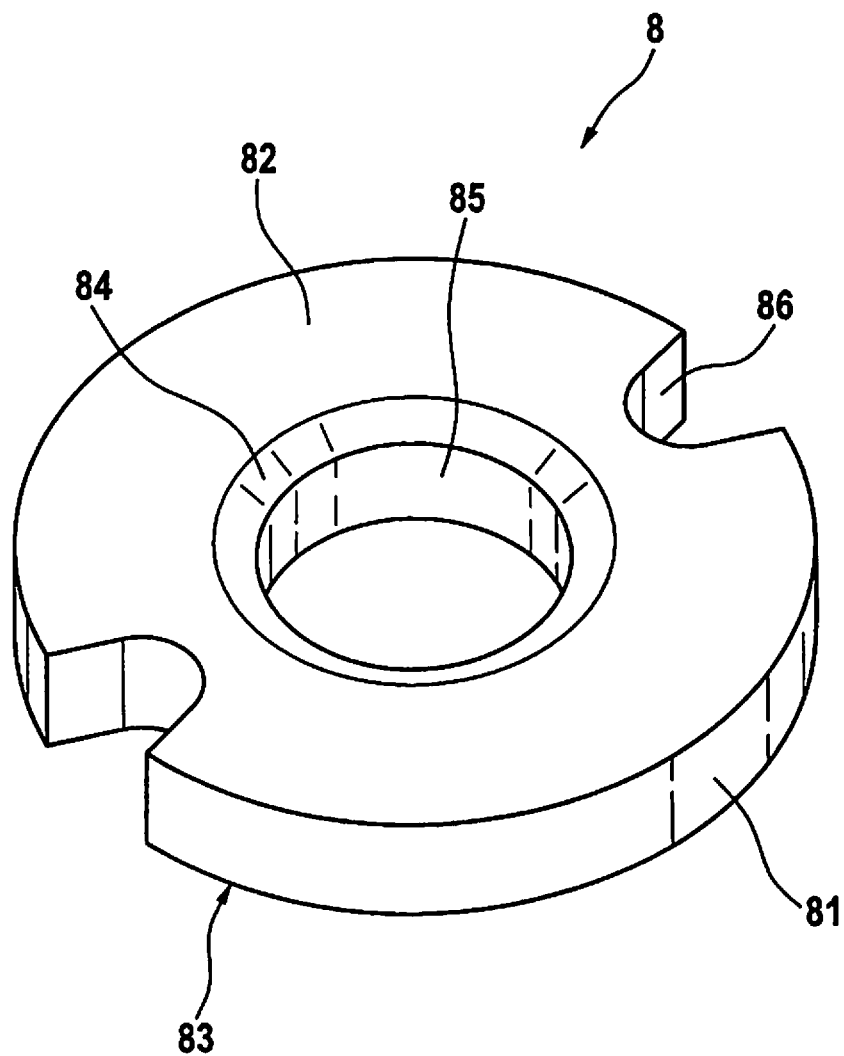
FIG. 3 shows a perspective view of one exemplary embodiment of a metal flux washer body prior to being pressed onto the base body.

One exemplary embodiment of metal washer 8 is shown in FIG. 3. The metal washer is manufactured from steel, for example, such as DC04. Metal washer 8 has a centric inside recess 85 for accommodating extension 94. Furthermore, metal washer 8, on an edge between inside recess 85 and an annular surface 82 facing away from solenoid coil 4, has a chamfer 84. As is also apparent from FIG. 3, metal washer 8 may, for example, have two constrictions 84 in the outer circumference which are diametrically opposed with respect to longitudinal axis 100.

Figure 4B:
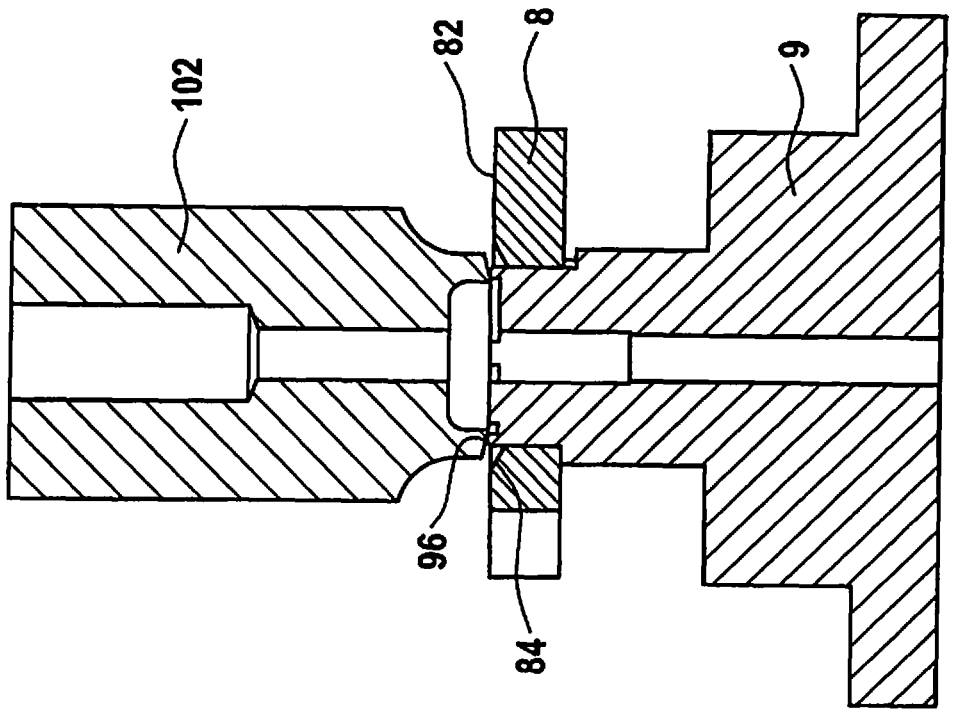
FIG. 4b shows one exemplary embodiment of a second pressing process carried out after the first pressing process.
Figure 4A:
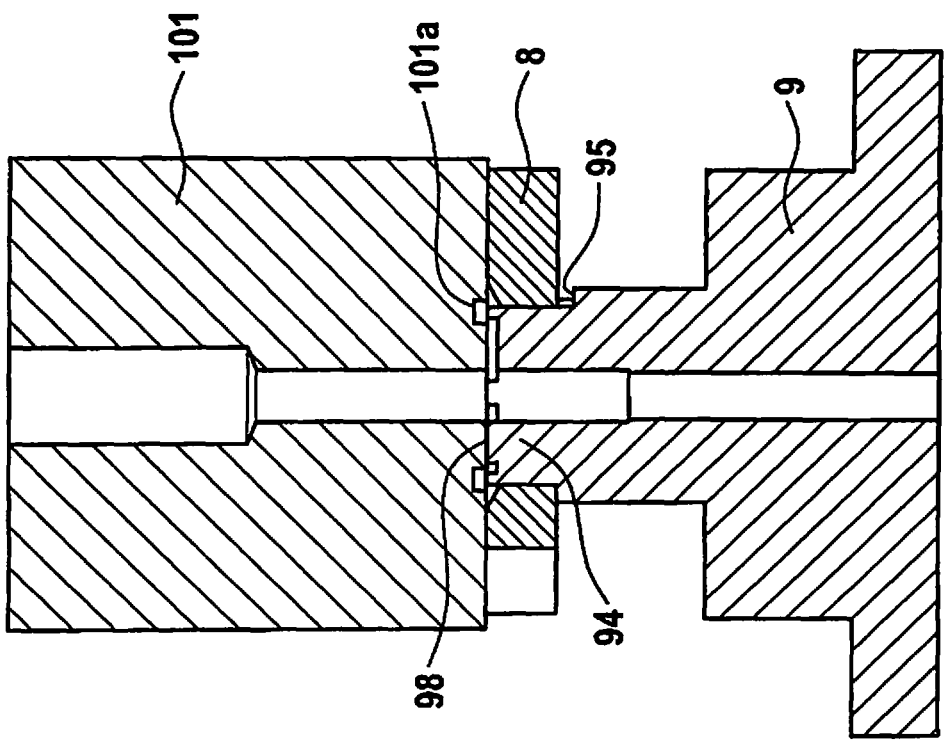
FIG. 4a shows one exemplary embodiment of a first pressing process of pressing the metal washer onto the base body.

The procedure for manufacturing flux washer body 10 may take place as shown in FIG. 4a and FIG. 4b, for example. First, base body 9 is held in a stationary manner. Then, in a first pressing process shown in FIG. 4, metal washer 8 is pressed onto extension 94 of retained base body 9 with the aid of a first pressing tool 101 resting against metal washer 8, until first pressing tool 101, as shown, strikes against stops 98 rising from end face 97 of extension 94. During pressing-on, clamping jaws 99 are permanently deformed on shoulder 95. As a result of the first pressing process, the metal washer is fixed to a defined degree with respect to longitudinal axis 102 on extension 94. As is apparent from FIG. 4a, an annular groove 101a in first pressing tool 101 prevents plastic deformation area 96 from already being deformed in the first pressing process.

After the first pressing process, the second pressing process shown in FIG. 4b is carried out. During the second pressing process, plastic deformation area 96 of base body 9 is deformed on end face 97 of extension 94 facing away from solenoid coil 4 by a second pressing tool 102 in such a way that the deformed material engages behind metal washer 8 on the side facing away from solenoid coil 4. The deformed material may penetrate into the area formed by chamfer 84 and extension 94 and the second pressing tool. As is easily apparent from FIG. 4b, metal washer 8 is not acted on, or acted on only little, by a pressing force during the second pressing process. The second pressing process is used to ensure that the material deformed from deformation area 96 engages behind metal washer 8 on the side facing away from solenoid coil 4, so that metal washer 8 is attached to base body 9.

Finally, the finished flux washer body may be installed on electromagnetic actuator 1, as shown in FIG. 1.

What is claimed is:

1. An electromagnetic actuator, comprising:
   an armature which is movable along a longitudinal axis in an armature chamber;
   a solenoid coil which extends around the longitudinal axis for generating a magnetic field for moving the armature;
   an actuating element coupled to the movements of the armature; and
   a flux washer body which is situated at an axial end of the solenoid coil and has a recess extending in a direction of the longitudinal axis in which the actuating element is displaceably mounted;
   wherein the flux washer body has a two-piece design and includes a base body made of sintered soft magnetic material, which faces the solenoid coil and in which the recess for the actuating element is situated, and a metal washer pressed onto an end of the base body facing away from the solenoid coil,
   wherein the base body has a shoulder on its side facing away from the solenoid coil, on which an extension projects in the direction of the longitudinal axis, the metal washer being pressed onto the extension,
   wherein the shoulder is disposed at an end of the extension which is closest to the armature and at a base of the extension.

2. The electromagnetic actuator as recited in claim 1, wherein at least one circumferential groove is formed on the flux washer body between the metal washer and the base body.

3. An electromagnetic actuator, comprising:
   an armature which is movable along a longitudinal axis in an armature chamber;
   a solenoid coil which extends around the longitudinal axis for generating a magnetic field for moving the armature;
   an actuating element coupled to the movements of the armature; and
   a flux washer body which is situated at an axial end of the solenoid coil and has a recess extending in a direction of the longitudinal axis in which the actuating element is displaceably mounted;
   wherein the flux washer body has a two-piece design and includes a base body made of sintered soft magnetic material, which faces the solenoid coil and in which the recess for the actuating element is situated, and a metal washer pressed onto an end of the base body facing away from the solenoid coil,
   wherein the base body has a shoulder on its side facing away from the solenoid coil, on which an extension projects in the direction of the longitudinal axis, the metal washer being pressed onto the extension,
   wherein clamping jaws are provided on the shoulder, which are permanently deformed as a result of the pressing-on of the metal washer.

4. The electromagnetic actuator as recited in claim 1, wherein at least one stop is provided on an end face of the extension facing away from the solenoid coil.

5. The electromagnetic actuator as recited in claim 1, wherein a plastic deformation area is provided on an end face of the extension facing away from the solenoid coil, wherein the material of the base body is configured to deform in such a way that the deformed material engages behind the metal washer on the side facing away from the solenoid coil.

6. The electromagnetic actuator as recited in claim 1, wherein the metal washer has a centric inside recess for accommodating the extension.

7. The electromagnetic actuator as recited in claim 6, wherein the metal washer, on an edge between the inside recess and an annular surface facing away from the solenoid coil, has a chamfer for accommodating the material of the base body engaging behind the metal washer.

8. A flux washer body for an electromagnetic actuator, wherein the flux washer body has a two-piece design and includes a base body made of sintered soft magnetic material, which faces a solenoid coil of the electromagnetic actuator and in which a recess for an actuating element of the electromagnetic actuator is situated, and a metal washer pressed onto an end of the base body facing away from the solenoid coil,
   wherein the base body has a shoulder having an extension projecting therefrom, the metal washer being pressed onto the extension,
   wherein clamping jaws are provided on the shoulder, which are permanently deformed as a result of the pressing-on of the metal washer.

9. A method for manufacturing an electromagnetic actuator, comprising:

manufacturing a flux washer body by providing a base body made of sintered soft magnetic material having a continuous recess, and pressing a metal washer onto one end of the base body; and assembling the flux washer body with a solenoid coil, an actuating element, and an armature to form an electromagnetic actuator, wherein the base body has a shoulder having an extension projecting therefrom, the metal washer being pressed onto the extension, wherein clamping jaws are provided on the shoulder, which are permanently deformed as a result of the pressing-on of the metal washer.

10. The method as recited in claim 9, wherein, the pressing includes, in a first pressing process, pressing the metal washer onto an extension of the base body made of the sintered soft magnetic material with the aid of a first pressing tool resting against a metal washer, until the first pressing tool makes contact with a stop rising from an end face of the extension.

11. The method for manufacturing an electromagnetic actuator as recited in claim 10, wherein a plastic deformation area of the base body is configured to be deformed on the end face of the extension facing away from the solenoid coil in a second pressing process, carried out after the first pressing process, wherein the deformed material engages behind the metal washer on the side facing away from the solenoid coil.

12. A method for manufacturing an electromagnetic actuator, comprising:

manufacturing a flux washer body by providing a base body made of sintered soft magnetic material having a continuous recess, and pressing a metal washer onto one end of the base body; and assembling the flux washer body with a solenoid coil, an actuating element, and an armature to form an electromagnetic actuator, wherein, the pressing includes, in a first pressing process, pressing the metal washer onto an extension of the base body made of the sintered soft magnetic material with the aid of a first pressing tool resting against the metal washer, until the first pressing tool makes contact with a stop rising from an end face of the extension, wherein during the pressing, clamping jaws are permanently deformed on a shoulder of the base body, wherein a plastic deformation area of the base body is configured to be deformed on the end face of the extension facing away from the solenoid coil in a second pressing process, carried out after the first pressing process, wherein the deformed material engages behind the metal washer on the side facing away from the solenoid coil.

* * * * *